United States Patent
Zbiciak et al.

(10) Patent No.: US 11,467,832 B2
(45) Date of Patent: *Oct. 11, 2022

(54) VECTOR FLOATING-POINT CLASSIFICATION

(71) Applicant: TEXAS INSTRUMENTS INCORPORATED, Dallas, TX (US)

(72) Inventors: Joseph Zbiciak, San Jose, CA (US); Brett L. Huber, Sugar Land, TX (US); Duc Bui, Grand Prairie, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/215,032

(22) Filed: Mar. 29, 2021

(65) Prior Publication Data

US 2021/0216319 A1    Jul. 15, 2021

Related U.S. Application Data

(63) Continuation of application No. 16/422,688, filed on May 24, 2019.

(51) Int. Cl.
*G06F 9/30* (2018.01)
*G06K 9/62* (2022.01)

(52) U.S. Cl.
CPC ........ *G06F 9/30036* (2013.01); *G06F 9/3013* (2013.01); *G06K 9/6267* (2013.01)

(58) Field of Classification Search
CPC ............................ G06F 9/30036; G06F 9/3013
See application file for complete search history.

(56) References Cited

U.S. PATENT DOCUMENTS

| 6,105,129 A * | 8/2000 | Meier ................. G06F 9/30036 712/222 |
| 6,487,575 B1 * | 11/2002 | Oberman .............. G06F 7/4873 708/504 |
| 6,490,607 B1 * | 12/2002 | Oberman .................. G06F 7/53 708/498 |

(Continued)

OTHER PUBLICATIONS

Intel, "Intel 64 and IA-32 Architectures Software Developer's Manual"; vol. 2 (2A, 2B, 2C, & 2D) Instruction Set References, A-Z, Order No. 325383-060US, Sep. 2016; 2198; in 23 parts.

*Primary Examiner* — Zachary K Huson
(74) *Attorney, Agent, or Firm* — Brian D. Graham; Charles A. Brill; Frank D. Cimino

(57) ABSTRACT

A method to classify source data in a processor in response to a vector floating-point classification instruction includes specifying, in respective fields of the vector floating-point classification instruction, a source register containing the source data and a destination register to store classification indications for the source data. The source register includes a plurality of lanes that each contains a floating-point value and the destination register includes a plurality of lanes corresponding to the lanes of the source register. The method further includes executing the vector floating-point classification instruction by, for each lane in the source register, classifying the floating-point value in the lane to identify a type of the floating-point value, and storing a value indicative of the identified type in the corresponding lane of the destination register.

20 Claims, 8 Drawing Sheets

(56) References Cited

U.S. PATENT DOCUMENTS

2014/0189290 A1* 7/2014 Wolrich ............... H04L 9/0662
  712/7
2014/0201502 A1 7/2014 Ould-Ahmed-Vall et al.
2017/0177359 A1* 6/2017 Ould-Ahmed-Vall ......................
  G06F 9/30043

* cited by examiner

VECTOR FLOATING-POINT CLASSIFICATION

CROSS-REFERENCE TO RELATED APPLICATIONS

This application is a continuation of U.S. patent application Ser. No. 16/422,688, filed May 24, 2019, which is incorporated by reference herein in its entirety.

BACKGROUND

Modern digital signal processors (DSP) face multiple challenges. DSPs may frequently execute software that requires emulating floating-point operations, such as division or trigonometric operations (e.g., sin, cos, tan). When performing such emulation, "special" floating-point value such as zero values, subnormal values, +/− infinity values, and not a number (NaN) values may need to be handled as special cases. However, determining whether a floating-point value is a special value often requires several instructions to extract fields from a floating-point value (e.g., a fraction field or an exponent field) and to test or compare those fields to properly classify the floating-point value. Considering that DSPs may be frequently required to emulate floating-point operations, such instruction and computational overhead is not desirable.

SUMMARY

In accordance with at least one example of the disclosure, a method to classify source data in a processor in response to a vector floating-point classification instruction includes specifying, in respective fields of the vector floating-point classification instruction, a source register containing the source data and a destination register to store classification indications for the source data. The source register includes a plurality of lanes that each contains a floating-point value and the destination register includes a plurality of lanes corresponding to the lanes of the source register. The method further includes executing the vector floating-point classification instruction by, for each lane in the source register, classifying the floating-point value in the lane to identify a type of the floating-point value, and storing a value indicative of the identified type in the corresponding lane of the destination register.

In accordance with another example of the disclosure, a data processor includes a source register configured to contain source data and a destination register. The source register includes a plurality of lanes that each contains a floating-point value and the destination register includes a plurality of lanes corresponding to the lanes of the source register. In response to execution of a single vector floating-point classification instruction, the data processor is configured to, for each lane in the source register, classify the floating-point value in the lane to identify a type of the floating-point value, and store a value indicative of the identified type in the corresponding lane of the destination register.

BRIEF DESCRIPTION OF THE DRAWINGS

For a detailed description of various examples, reference will now be made to the accompanying drawings in which:

FIGS. 15A and 15B show instruction coding of instructions in accordance with various examples.

DETAILED DESCRIPTION

Figure 1:
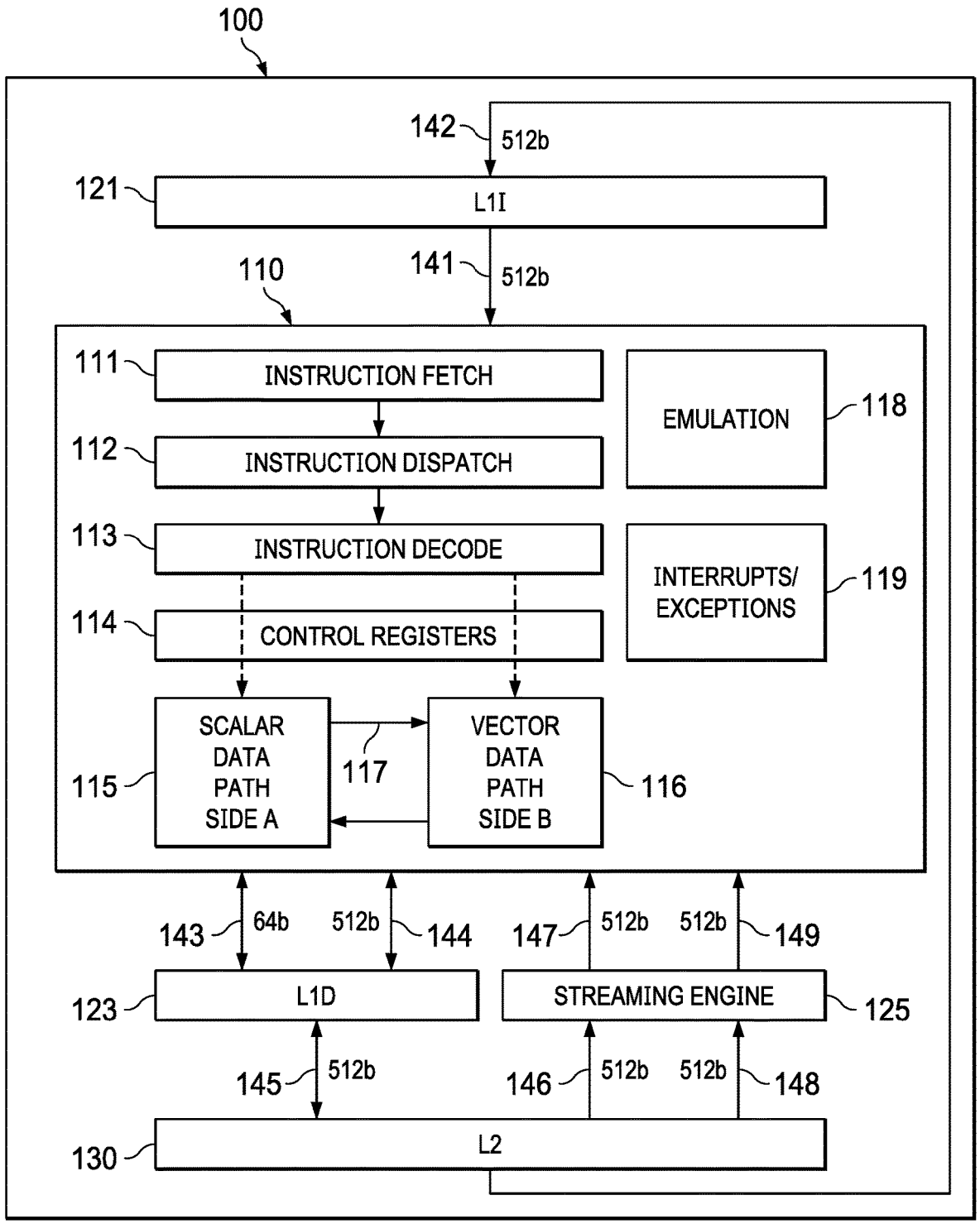
FIG. 1 shows a dual scalar/vector datapath processor in accordance with various examples.

As explained above, DSPs often execute software that requires emulating floating-point operations. Special floating-point values such as zero values, subnormal values, +/− infinity values, and not a number (NaN) values may need to be handled as special cases. However, classifying floating-point values as one of the special value types may require several instructions to extract fields from a floating-point value (e.g., a fraction field or an exponent field) and to test or compare those fields to properly classify the floating-point value. Since emulation of floating-point operations carried out by the DSP may be frequent and repetitive, increased instruction and computational overhead to effectively classify a floating-point value is not desirable.

In order to improve performance of a DSP emulating or carrying out floating-point operations, at least by reducing the instruction and computational overhead required to carry out those functions, examples of the present disclosure are directed to a vector floating-point classification instruction that classifies source data including floating-point values in a source register and stores an indication of the type of floating-point value in a destination register. The vector floating-point classification instruction is a single-instruction-multiple-data (SIMD) instruction that operates on data in corresponding lanes of the source register. For example, the source register is a 512-bit vector register, and each lane is a 32-bit lane (e.g., a single precision floating-point value), such that 16 floating-point values are classified and 16 corresponding indications of the type of floating-point value are stored in the destination register. In another example, the source register is a 512-bit vector register, and each lane is a 64-bit lane (e.g., a double precision floating-point value), such that 8 floating-point values are classified and 8 corresponding indications of the type of floating-point value are stored in the destination register.

By implementing a single vector floating-point classification instruction that classifies floating-point values and stores indications of the identified type of floating-point value, emulation of floating-point operations is carried out with reduced instruction and computational overhead by quickly identifying special floating-point values, which may need to be treated as special cases depending on the floating-point operation being emulated or carried out. As a result, the overall performance of the DSP is improved when emulating or carrying out floating-point operations, particularly when a special floating-point value is identified that should be handled as a special case. Additionally, the indications of the identified type of floating-point value are stored in corresponding lanes of a destination register, which allows vectorized forms of functions to utilize the identified types or classifications of floating-point values and correctly handle special values in individual vector lanes. For example, vector predicates may be applied as appropriate to certain vector lanes in which the floating-point value has been classified as a special type of floating-point value, which will be described in further detail below.

FIG. 1 illustrates a dual scalar/vector datapath processor in accordance with various examples of this disclosure. Processor 100 includes separate level one instruction cache (L1I) 121 and level one data cache (L1D) 123. Processor 100 includes a level two combined instruction/data cache (L2) 130 that holds both instructions and data. FIG. 1 illustrates connection between level one instruction cache 121 and level two combined instruction/data cache 130 (bus 142). FIG. 1 illustrates connection between level one data cache 123 and level two combined instruction/data cache 130 (bus 145). In an example, processor 100 level two combined instruction/data cache 130 stores both instructions to back up level one instruction cache 121 and data to back up level one data cache 123. In this example, level two combined instruction/data cache 130 is further connected to higher level cache and/or main memory in a manner known in the art and not illustrated in FIG. 1. In this example, central processing unit core 110, level one instruction cache 121, level one data cache 123 and level two combined instruction/data cache 130 are formed on a single integrated circuit. This signal integrated circuit optionally includes other circuits.

Central processing unit core 110 fetches instructions from level one instruction cache 121 as controlled by instruction fetch unit 111. Instruction fetch unit 111 determines the next instructions to be executed and recalls a fetch packet sized set of such instructions. The nature and size of fetch packets are further detailed below. As known in the art, instructions are directly fetched from level one instruction cache 121 upon a cache hit (if these instructions are stored in level one instruction cache 121). Upon a cache miss (the specified instruction fetch packet is not stored in level one instruction cache 121), these instructions are sought in level two combined cache 130. In this example, the size of a cache line in level one instruction cache 121 equals the size of a fetch packet. The memory locations of these instructions are either a hit in level two combined cache 130 or a miss. A hit is serviced from level two combined cache 130. A miss is serviced from a higher level of cache (not illustrated) or from main memory (not illustrated). As is known in the art, the requested instruction may be simultaneously supplied to both level one instruction cache 121 and central processing unit core 110 to speed use.

In an example, central processing unit core 110 includes plural functional units to perform instruction specified data processing tasks. Instruction dispatch unit 112 determines the target functional unit of each fetched instruction. In this example, central processing unit 110 operates as a very long instruction word (VLIW) processor capable of operating on plural instructions in corresponding functional units simultaneously. Preferably a complier organizes instructions in execute packets that are executed together. Instruction dispatch unit 112 directs each instruction to its target functional unit. The functional unit assigned to an instruction is completely specified by the instruction produced by a compiler. The hardware of central processing unit core 110 has no part in this functional unit assignment. In this example, instruction dispatch unit 112 may operate on plural instructions in parallel. The number of such parallel instructions is set by the size of the execute packet. This will be further detailed below.

One part of the dispatch task of instruction dispatch unit 112 is determining whether the instruction is to execute on a functional unit in scalar datapath side A 115 or vector datapath side B 116. An instruction bit within each instruction called the s bit determines which datapath the instruction controls. This will be further detailed below.

Instruction decode unit 113 decodes each instruction in a current execute packet. Decoding includes identification of the functional unit performing the instruction, identification of registers used to supply data for the corresponding data processing operation from among possible register files and identification of the register destination of the results of the corresponding data processing operation. As further explained below, instructions may include a constant field in place of one register number operand field. The result of this decoding is signals for control of the target functional unit to perform the data processing operation specified by the corresponding instruction on the specified data.

Central processing unit core 110 includes control registers 114. Control registers 114 store information for control of the functional units in scalar datapath side A 115 and vector datapath side B 116. This information could be mode information or the like.

The decoded instructions from instruction decode 113 and information stored in control registers 114 are supplied to scalar datapath side A 115 and vector datapath side B 116. As a result functional units within scalar datapath side A 115 and vector datapath side B 116 perform instruction specified data processing operations upon instruction specified data and store the results in an instruction specified data register or registers. Each of scalar datapath side A 115 and vector datapath side B 116 includes plural functional units that preferably operate in parallel. These will be further detailed below in conjunction with FIG. 2. There is a datapath 117 between scalar datapath side A 115 and vector datapath side B 116 permitting data exchange.

Central processing unit core 110 includes further non-instruction based modules. Emulation unit 118 permits determination of the machine state of central processing unit core 110 in response to instructions. This capability will typically be employed for algorithmic development. Interrupts/exceptions unit 119 enables central processing unit core 110 to be responsive to external, asynchronous events (interrupts) and to respond to attempts to perform improper operations (exceptions).

Central processing unit core 110 includes streaming engine 125. Streaming engine 125 of this illustrated embodiment supplies two data streams from predetermined addresses typically cached in level two combined cache 130 to register files of vector datapath side B 116. This provides controlled data movement from memory (as cached in level two combined cache 130) directly to functional unit operand inputs. This is further detailed below.

FIG. 1 illustrates exemplary data widths of busses between various parts. Level one instruction cache 121 supplies instructions to instruction fetch unit 111 via bus 141. Bus 141 is preferably a 512-bit bus. Bus 141 is unidirectional from level one instruction cache 121 to central processing unit 110. Level two combined cache 130 supplies instructions to level one instruction cache 121 via bus 142. Bus 142 is preferably a 512-bit bus. Bus 142 is unidirectional from level two combined cache 130 to level one instruction cache 121.

Level one data cache 123 exchanges data with register files in scalar datapath side A 115 via bus 143. Bus 143 is preferably a 64-bit bus. Level one data cache 123 exchanges data with register files in vector datapath side B 116 via bus 144. Bus 144 is preferably a 512-bit bus. Busses 143 and 144 are illustrated as bidirectional supporting both central processing unit 110 data reads and data writes. Level one data cache 123 exchanges data with level two combined cache 130 via bus 145. Bus 145 is preferably a 512-bit bus. Bus 145 is illustrated as bidirectional supporting cache service for both central processing unit 110 data reads and data writes.

As known in the art, CPU data requests are directly fetched from level one data cache 123 upon a cache hit (if the requested data is stored in level one data cache 123). Upon a cache miss (the specified data is not stored in level one data cache 123), this data is sought in level two combined cache 130. The memory locations of this requested data is either a hit in level two combined cache 130 or a miss. A hit is serviced from level two combined cache 130. A miss is serviced from another level of cache (not illustrated) or from main memory (not illustrated). As is known in the art, the requested instruction may be simultaneously supplied to both level one data cache 123 and central processing unit core 110 to speed use.

Level two combined cache 130 supplies data of a first data stream to streaming engine 125 via bus 146. Bus 146 is preferably a 512-bit bus. Streaming engine 125 supplies data of this first data stream to functional units of vector datapath side B 116 via bus 147. Bus 147 is preferably a 512-bit bus. Level two combined cache 130 supplies data of a second data stream to streaming engine 125 via bus 148. Bus 148 is preferably a 512-bit bus. Streaming engine 125 supplies data of this second data stream to functional units of vector datapath side B 116 via bus 149. Bus 149 is preferably a 512-bit bus. Busses 146, 147, 148 and 149 are illustrated as unidirectional from level two combined cache 130 to streaming engine 125 and to vector datapath side B 116 in accordance with various examples of this disclosure.

Streaming engine 125 data requests are directly fetched from level two combined cache 130 upon a cache hit (if the requested data is stored in level two combined cache 130). Upon a cache miss (the specified data is not stored in level two combined cache 130), this data is sought from another level of cache (not illustrated) or from main memory (not illustrated). It is technically feasible in some examples for level one data cache 123 to cache data not stored in level two combined cache 130. If such operation is supported, then upon a streaming engine 125 data request that is a miss in level two combined cache 130, level two combined cache 130 should snoop level one data cache 123 for the stream engine 125 requested data. If level one data cache 123 stores this data its snoop response would include the data, which is then supplied to service the streaming engine 125 request. If level one data cache 123 does not store this data its snoop response would indicate this and level two combined cache 130 must service this streaming engine 125 request from another level of cache (not illustrated) or from main memory (not illustrated).

In an example, both level one data cache 123 and level two combined cache 130 may be configured as selected amounts of cache or directly addressable memory in accordance with U.S. Pat. No. 6,606,686 entitled UNIFIED MEMORY SYSTEM ARCHITECTURE INCLUDING CACHE AND DIRECTLY ADDRESSABLE STATIC RANDOM ACCESS MEMORY.

Figure 2:
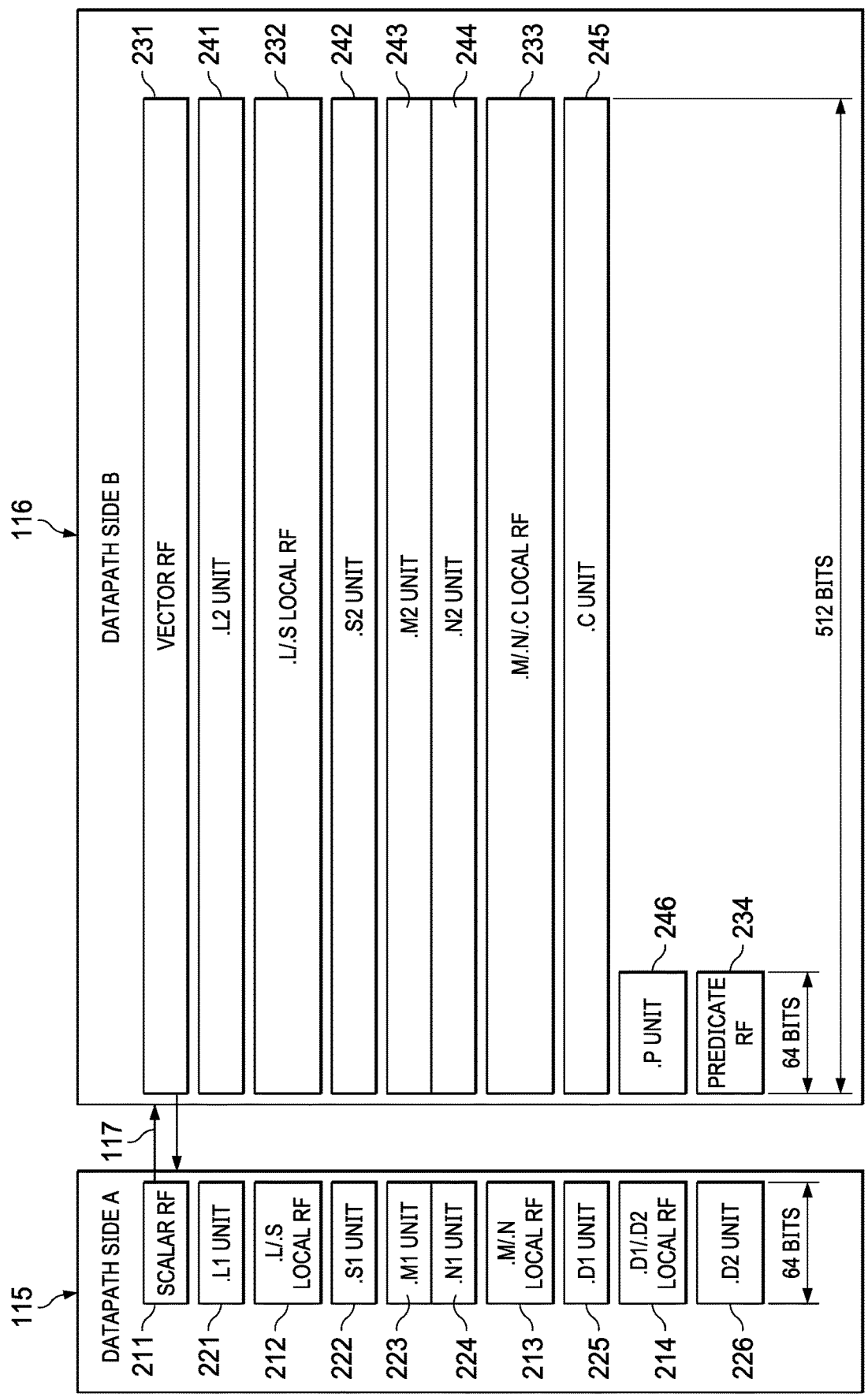
FIG. 2 shows the registers and functional units in the dual scalar/vector datapath processor illustrated in FIG. 1 and in accordance with various examples.

FIG. 2 illustrates further details of functional units and register files within scalar datapath side A 115 and vector datapath side B 116. Scalar datapath side A 115 includes global scalar register file 211, L1/S1 local register file 212, M1/N1 local register file 213 and D1/D2 local register file 214. Scalar datapath side A 115 includes L1 unit 221, S1 unit 222, M1 unit 223, N1 unit 224, D1 unit 225 and D2 unit 226. Vector datapath side B 116 includes global vector register file 231, L2/52 local register file 232, M2/N2/C local register file 233 and predicate register file 234. Vector datapath side B 116 includes L2 unit 241, S2 unit 242, M2 unit 243, N2 unit 244, C unit 245 and P unit 246. There are limitations upon which functional units may read from or write to which register files. These will be detailed below.

Scalar datapath side A 115 includes L1 unit 221. L1 unit 221 generally accepts two 64-bit operands and produces one 64-bit result. The two operands are each recalled from an instruction specified register in either global scalar register file 211 or L1/S1 local register file 212. L1 unit 221 preferably performs the following instruction selected operations: 64-bit add/subtract operations; 32-bit min/max operations; 8-bit Single Instruction Multiple Data (SIMD) instructions such as sum of absolute value, minimum and maximum determinations; circular min/max operations; and various move operations between register files. The result may be written into an instruction specified register of global scalar register file 211, L1/S1 local register file 212, M1/N1 local register file 213 or D1/D2 local register file 214.

Scalar datapath side A 115 includes S1 unit 222. S1 unit 222 generally accepts two 64-bit operands and produces one 64-bit result. The two operands are each recalled from an instruction specified register in either global scalar register file 211 or L1/S1 local register file 212. S1 unit 222 preferably performs the same type operations as L1 unit 221. There optionally may be slight variations between the data processing operations supported by L1 unit 221 and S1 unit 222. The result may be written into an instruction specified register of global scalar register file 211, L1/S1 local register file 212, M1/N1 local register file 213 or D1/D2 local register file 214.

Scalar datapath side A 115 includes M1 unit 223. M1 unit 223 generally accepts two 64-bit operands and produces one 64-bit result. The two operands are each recalled from an instruction specified register in either global scalar register file 211 or M1/N1 local register file 213. M1 unit 223 preferably performs the following instruction selected operations: 8-bit multiply operations; complex dot product operations; 32-bit count operations; complex conjugate multiply operations; and bit-wise Logical Operations, moves, adds and subtracts. The result may be written into an instruction specified register of global scalar register file 211, L1/S1 local register file 212, M1/N1 local register file 213 or D1/D2 local register file 214.

Scalar datapath side A 115 includes N1 unit 224. N1 unit 224 generally accepts two 64-bit operands and produces one 64-bit result. The two operands are each recalled from an instruction specified register in either global scalar register file 211 or M1/N1 local register file 213. N1 unit 224 preferably performs the same type operations as M1 unit 223. There may be certain double operations (called dual issued instructions) that employ both the M1 unit 223 and the N1 unit 224 together. The result may be written into an instruction specified register of global scalar register file 211, L1/S1 local register file 212, M1/N1 local register file 213 or D1/D2 local register file 214.

Scalar datapath side A 115 includes D1 unit 225 and D2 unit 226. D1 unit 225 and D2 unit 226 generally each accept two 64-bit operands and each produce one 64-bit result. D1 unit 225 and D2 unit 226 generally perform address calculations and corresponding load and store operations. D1 unit 225 is used for scalar loads and stores of 64 bits. D2 unit 226 is used for vector loads and stores of 512 bits. D1 unit 225 and D2 unit 226 preferably also perform: swapping, pack and unpack on the load and store data; 64-bit SIMD arithmetic operations; and 64-bit bit-wise logical operations. D1/D2 local register file 214 will generally store base and offset addresses used in address calculations for the corresponding loads and stores. The two operands are each recalled from an instruction specified register in either global scalar register file 211 or D1/D2 local register file 214. The calculated result may be written into an instruction specified register of global scalar register file 211, L1/S1 local register file 212, M1/N1 local register file 213 or D1/D2 local register file 214.

Vector datapath side B 116 includes L2 unit 241. L2 unit 241 generally accepts two 512-bit operands and produces one 512-bit result. The two operands are each recalled from an instruction specified register in either global vector register file 231, L2/S2 local register file 232 or predicate register file 234. L2 unit 241 preferably performs instruction similar to L1 unit 221 except on wider 512-bit data. The result may be written into an instruction specified register of global vector register file 231, L2/S2 local register file 232, M2/N2/C local register file 233 or predicate register file 234.

Vector datapath side B 116 includes S2 unit 242. S2 unit 242 generally accepts two 512-bit operands and produces one 512-bit result. The two operands are each recalled from an instruction specified register in either global vector register file 231, L2/S2 local register file 232 or predicate register file 234. S2 unit 242 preferably performs instructions similar to S1 unit 222. The result may be written into an instruction specified register of global vector register file 231, L2/52 local register file 232, M2/N2/C local register file 233 or predicate register file 234.

Vector datapath side B 116 includes M2 unit 243. M2 unit 243 generally accepts two 512-bit operands and produces one 512-bit result. The two operands are each recalled from an instruction specified register in either global vector register file 231 or M2/N2/C local register file 233. M2 unit 243 preferably performs instructions similar to M1 unit 223 except on wider 512-bit data. The result may be written into an instruction specified register of global vector register file 231, L2/52 local register file 232 or M2/N2/C local register file 233.

Vector datapath side B 116 includes N2 unit 244. N2 unit 244 generally accepts two 512-bit operands and produces one 512-bit result. The two operands are each recalled from an instruction specified register in either global vector register file 231 or M2/N2/C local register file 233. N2 unit 244 preferably performs the same type operations as M2 unit 243. There may be certain double operations (called dual issued instructions) that employ both M2 unit 243 and the N2 unit 244 together. The result may be written into an instruction specified register of global vector register file 231, L2/S2 local register file 232 or M2/N2/C local register file 233.

Vector datapath side B 116 includes C unit 245. C unit 245 generally accepts two 512-bit operands and produces one 512-bit result. The two operands are each recalled from an instruction specified register in either global vector register file 231 or M2/N2/C local register file 233. C unit 245 preferably performs: "Rake" and "Search" instructions; up to 512 2-bit PN*8-bit multiplies I/Q complex multiplies per clock cycle; 8-bit and 16-bit Sum-of-Absolute-Difference (SAD) calculations, up to 512 SADs per clock cycle; horizontal add and horizontal min/max instructions; and vector permutes instructions. C unit 245 also contains 4 vector control registers (CUCR0 to CUCR3) used to control certain operations of C unit 245 instructions. Control registers CUCR0 to CUCR3 are used as operands in certain C unit 245 operations. Control registers CUCR0 to CUCR3 are preferably used: in control of a general permutation instruction (VPERM); and as masks for SIMD multiple DOT product operations (DOTPM) and SIMD multiple Sum-of-Absolute-Difference (SAD) operations. Control register CUCR0 is preferably used to store the polynomials for Galois Field Multiply operations (GFMPY). Control register CUCR1 is preferably used to store the Galois field polynomial generator function.

Vector datapath side B 116 includes P unit 246. P unit 246 performs basic logic operations on registers of local predicate register file 234. P unit 246 has direct access to read from and write to predication register file 234. These operations include single register unary operations such as: NEG (negate) which inverts each bit of the single register; BITCNT (bit count) which returns a count of the number of bits in the single register having a predetermined digital state (1 or 0); RMBD (right most bit detect) which returns a number of bit positions from the least significant bit position (right most) to a first bit position having a predetermined digital state (1 or 0); DECIMATE which selects every instruction specified Nth (1, 2, 4, etc.) bit to output; and EXPAND which replicates each bit an instruction specified N times (2, 4, etc.). These operations include two register binary operations such as: AND a bitwise AND of data of the two registers; NAND a bitwise AND and negate of data of the two registers; OR a bitwise OR of data of the two registers; NOR a bitwise OR and negate of data of the two registers; and XOR exclusive OR of data of the two registers. These operations include transfer of data from a predicate register of predicate register file 234 to another specified predicate register or to a specified data register in global vector register file 231. A commonly expected use of P unit 246 includes manipulation of the SIMD vector comparison results for use in control of a further SIMD vector operation. The BITCNT instruction may be used to count the number of 1's in a predicate register to determine the number of valid data elements from a predicate register.

Figure 3:
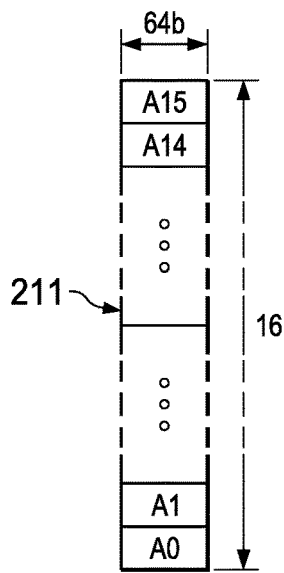
FIG. 3 shows an exemplary global scalar register file.

FIG. 3 illustrates global scalar register file 211. There are 16 independent 64-bit wide scalar registers designated A0 to A15. Each register of global scalar register file 211 can be read from or written to as 64-bits of scalar data. All scalar datapath side A 115 functional units (L1 unit 221, S1 unit 222, M1 unit 223, N1 unit 224, D1 unit 225 and D2 unit 226) can read or write to global scalar register file 211. Global scalar register file 211 may be read as 32-bits or as 64-bits and may only be written to as 64-bits. The instruction executing determines the read data size. Vector datapath side B 116 functional units (L2 unit 241, S2 unit 242, M2 unit 243, N2 unit 244, C unit 245 and P unit 246) can read from global scalar register file 211 via crosspath 117 under restrictions that will be detailed below.

Figure 4:
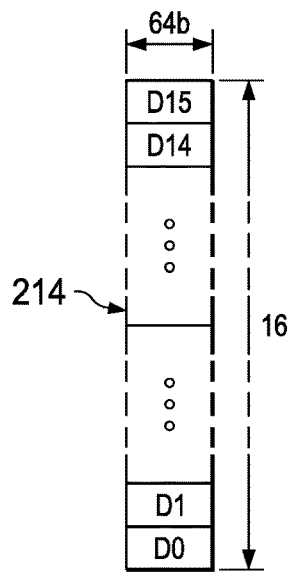
FIG. 4 shows an exemplary local scalar register file shared by arithmetic functional units.

FIG. 4 illustrates D1/D2 local register file 214. There are 16 independent 64-bit wide scalar registers designated D0 to D16. Each register of D1/D2 local register file 214 can be read from or written to as 64-bits of scalar data. All scalar datapath side A 115 functional units (L1 unit 221, S1 unit 222, M1 unit 223, N1 unit 224, D1 unit 225 and D2 unit 226) can write to global scalar register file 211. Only D1 unit 225 and D2 unit 226 can read from D1/D2 local scalar register file 214. It is expected that data stored in D1/D2 local scalar register file 214 will include base addresses and offset addresses used in address calculation.

Figure 5:
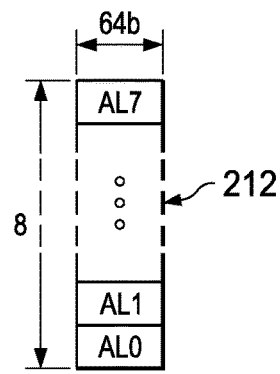
FIG. 5 shows an exemplary local scalar register file shared by multiply functional units.

FIG. 5 illustrates L1/S1 local register file 212. The example illustrated in FIG. 5 has 8 independent 64-bit wide scalar registers designated AL0 to AL7. The preferred instruction coding (see FIGS. 15A and 15B) permits L1/S1 local register file 212 to include up to 16 registers. The example of FIG. 5 implements only 8 registers to reduce circuit size and complexity. Each register of L1/S1 local register file 212 can be read from or written to as 64-bits of scalar data. All scalar datapath side A 115 functional units (L1 unit 221, S1 unit 222, M1 unit 223, N1 unit 224, D1 unit 225 and D2 unit 226) can write to L1/S1 local scalar register file 212. Only L1 unit 221 and S1 unit 222 can read from L1/S1 local scalar register file 212.

Figure 6:
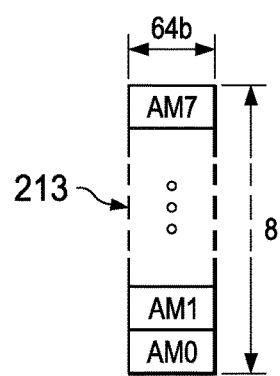
FIG. 6 shows an exemplary local scalar register file shared by load/store units.

FIG. 6 illustrates M1/N1 local register file 213. The example illustrated in FIG. 6 has 8 independent 64-bit wide scalar registers designated AM0 to AM7. The preferred instruction coding (see FIGS. 15A and 15B) permits M1/N1 local register file 213 to include up to 16 registers. The example of FIG. 6 implements only 8 registers to reduce circuit size and complexity. Each register of M1/N1 local register file 213 can be read from or written to as 64-bits of scalar data. All scalar datapath side A 115 functional units (L1 unit 221, S1 unit 222, M1 unit 223, N1 unit 224, D1 unit 225 and D2 unit 226) can write to M1/N1 local scalar register file 213. Only M1 unit 223 and N1 unit 224 can read from M1/N1 local scalar register file 213.

Figure 7:
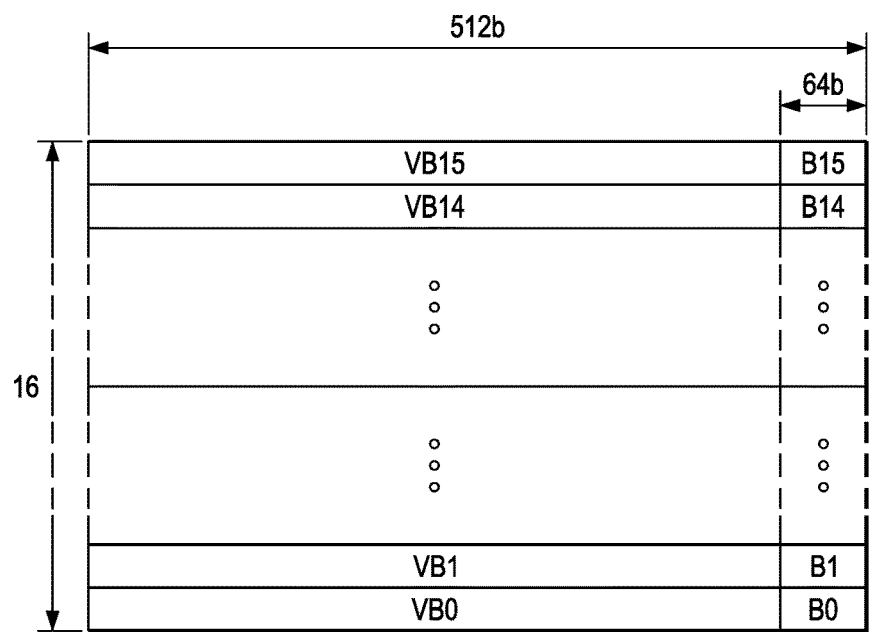
FIG. 7 shows an exemplary global vector register file.

FIG. 7 illustrates global vector register file 231. There are 16 independent 512-bit wide vector registers. Each register of global vector register file 231 can be read from or written to as 64-bits of scalar data designated B0 to B15. Each register of global vector register file 231 can be read from or written to as 512-bits of vector data designated VB0 to VB15. The instruction type determines the data size. All vector datapath side B 116 functional units (L2 unit 241, S2 unit 242, M2 unit 243, N2 unit 244, C unit 245 and P unit 246) can read or write to global scalar register file 231. Scalar datapath side A 115 functional units (L1 unit 221, S1 unit 222, M1 unit 223, N1 unit 224, D1 unit 225 and D2 unit 226) can read from global vector register file 231 via crosspath 117 under restrictions that will be detailed below.

Figure 8:
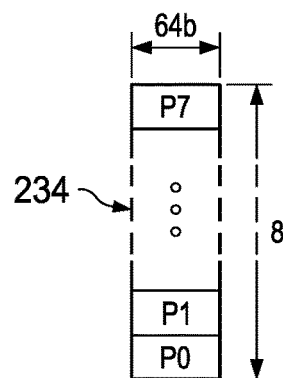
FIG. 8 shows an exemplary predicate register file.

FIG. 8 illustrates P local register file 234. There are 8 independent 64-bit wide registers designated P0 to P7. Each register of P local register file 234 can be read from or written to as 64-bits of scalar data. Vector datapath side B 116 functional units L2 unit 241, S2 unit 242, C unit 244 and P unit 246 can write to P local register file 234. Only L2 unit 241, S2 unit 242 and P unit 246 can read from P local scalar register file 234. A commonly expected use of P local register file 234 includes: writing one bit SIMD vector comparison results from L2 unit 241, S2 unit 242 or C unit 244; manipulation of the SIMD vector comparison results by P unit 246; and use of the manipulated results in control of a further SIMD vector operation.

Figure 9:
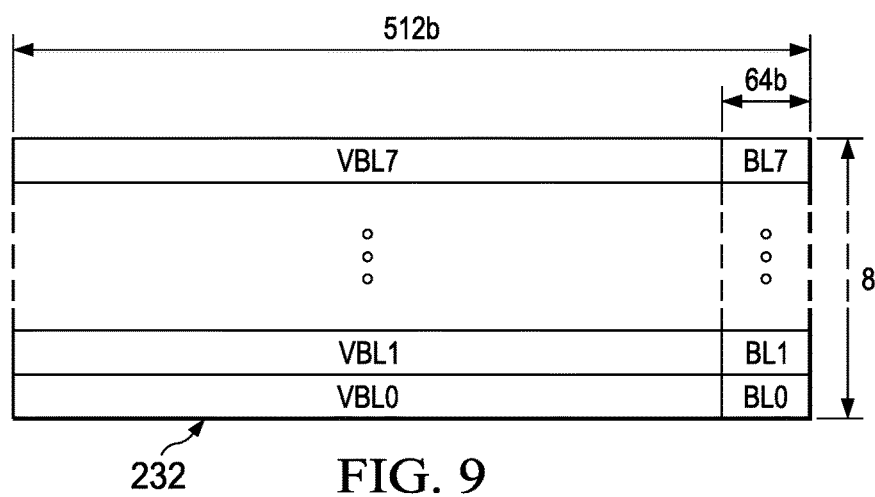
FIG. 9 shows an exemplary local vector register file shared by arithmetic functional units.

FIG. 9 illustrates L2/S2 local register file 232. The example illustrated in FIG. 9 has 8 independent 512-bit wide vector registers. The preferred instruction coding (see FIGS. 15A and 15B) permits L2/52 local register file 232 to include up to 16 registers. The example of FIG. 9 implements only 8 registers to reduce circuit size and complexity. Each register of L2/52 local vector register file 232 can be read from or written to as 64-bits of scalar data designated BL0 to BL7. Each register of L2/52 local vector register file 232 can be read from or written to as 512-bits of vector data designated VBL0 to VBL7. The instruction type determines the data size. All vector datapath side B 116 functional units (L2 unit 241, S2 unit 242, M2 unit 243, N2 unit 244, C unit 245 and P unit 246) can write to L2/52 local vector register file 232. Only L2 unit 241 and S2 unit 242 can read from L2/52 local vector register file 232.

Figure 10:
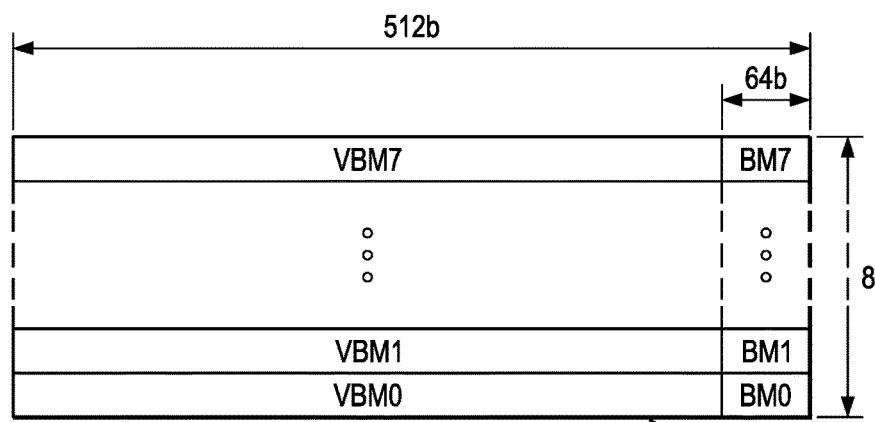
FIG. 10 shows an exemplary local vector register file shared by multiply and correlation functional units.

FIG. 10 illustrates M2/N2/C local register file 233. The example illustrated in FIG. 10 has 8 independent 512-bit wide vector registers. The preferred instruction coding (see FIGS. 15A and 15B) permits M2/N2/C local vector register file 233 include up to 16 registers. The example of FIG. 10 implements only 8 registers to reduce circuit size and complexity. Each register of M2/N2/C local vector register file 233 can be read from or written to as 64-bits of scalar data designated BM0 to BM7. Each register of M2/N2/C local vector register file 233 can be read from or written to as 512-bits of vector data designated VBM0 to VBM7. All vector datapath side B 116 functional units (L2 unit 241, S2 unit 242, M2 unit 243, N2 unit 244, C unit 245 and P unit 246) can write to M2/N2/C local vector register file 233. Only M2 unit 243, N2 unit 244 and C unit 245 can read from M2/N2/C local vector register file 233.

The provision of global register files accessible by all functional units of a side and local register files accessible by only some of the functional units of a side is a design choice. Some examples of this disclosure employ only one type of register file corresponding to the disclosed global register files.

Referring back to FIG. 2, crosspath 117 permits limited exchange of data between scalar datapath side A 115 and vector datapath side B 116. During each operational cycle one 64-bit data word can be recalled from global scalar register file A 211 for use as an operand by one or more functional units of vector datapath side B 116 and one 64-bit data word can be recalled from global vector register file 231 for use as an operand by one or more functional units of scalar datapath side A 115. Any scalar datapath side A 115 functional unit (L1 unit 221, S1 unit 222, M1 unit 223, N1 unit 224, D1 unit 225 and D2 unit 226) may read a 64-bit operand from global vector register file 231. This 64-bit operand is the least significant bits of the 512-bit data in the accessed register of global vector register file 231. Plural scalar datapath side A 115 functional units may employ the same 64-bit crosspath data as an operand during the same operational cycle. However, only one 64-bit operand is transferred from vector datapath side B 116 to scalar datapath side A 115 in any single operational cycle. Any vector datapath side B 116 functional unit (L2 unit 241, S2 unit 242, M2 unit 243, N2 unit 244, C unit 245 and P unit 246) may read a 64-bit operand from global scalar register file 211. If the corresponding instruction is a scalar instruction, the crosspath operand data is treated as any other 64-bit operand. If the corresponding instruction is a vector instruction, the upper 448 bits of the operand are zero filled. Plural vector datapath side B 116 functional units may employ the same 64-bit crosspath data as an operand during the same operational cycle. Only one 64-bit operand is transferred from scalar datapath side A 115 to vector datapath side B 116 in any single operational cycle.

Streaming engine 125 transfers data in certain restricted circumstances. Streaming engine 125 controls two data streams. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have a fixed sequence of elements. Thus, programs cannot seek randomly within the stream. The stream data is read-only while active. Programs cannot write to a stream while simultaneously reading from it. Once a stream is opened, the streaming engine 125: calculates the address; fetches the defined data type from level two unified cache (which may require cache service from a higher level memory); performs data type manipulation such as zero extension, sign extension, data element sorting/swapping such as matrix transposition; and delivers the data directly to the programmed data register file within CPU 110. Streaming engine 125 is thus useful for real-time digital filtering operations on well-behaved data. Streaming engine 125 frees these memory fetch tasks from the corresponding CPU enabling other processing functions.

Streaming engine 125 provides the following benefits. Streaming engine 125 permits multi-dimensional memory accesses. Streaming engine 125 increases the available bandwidth to the functional units. Streaming engine 125 minimizes the number of cache miss stalls since the stream buffer bypasses level one data cache 123. Streaming engine 125 reduces the number of scalar operations required to maintain a loop. Streaming engine 125 manages address pointers. Streaming engine 125 handles address generation automatically freeing up the address generation instruction slots and D1 unit 225 and D2 unit 226 for other computations.

CPU 110 operates on an instruction pipeline. Instructions are fetched in instruction packets of fixed length further described below. All instructions require the same number of pipeline phases for fetch and decode, but require a varying number of execute phases.

Figure 11:
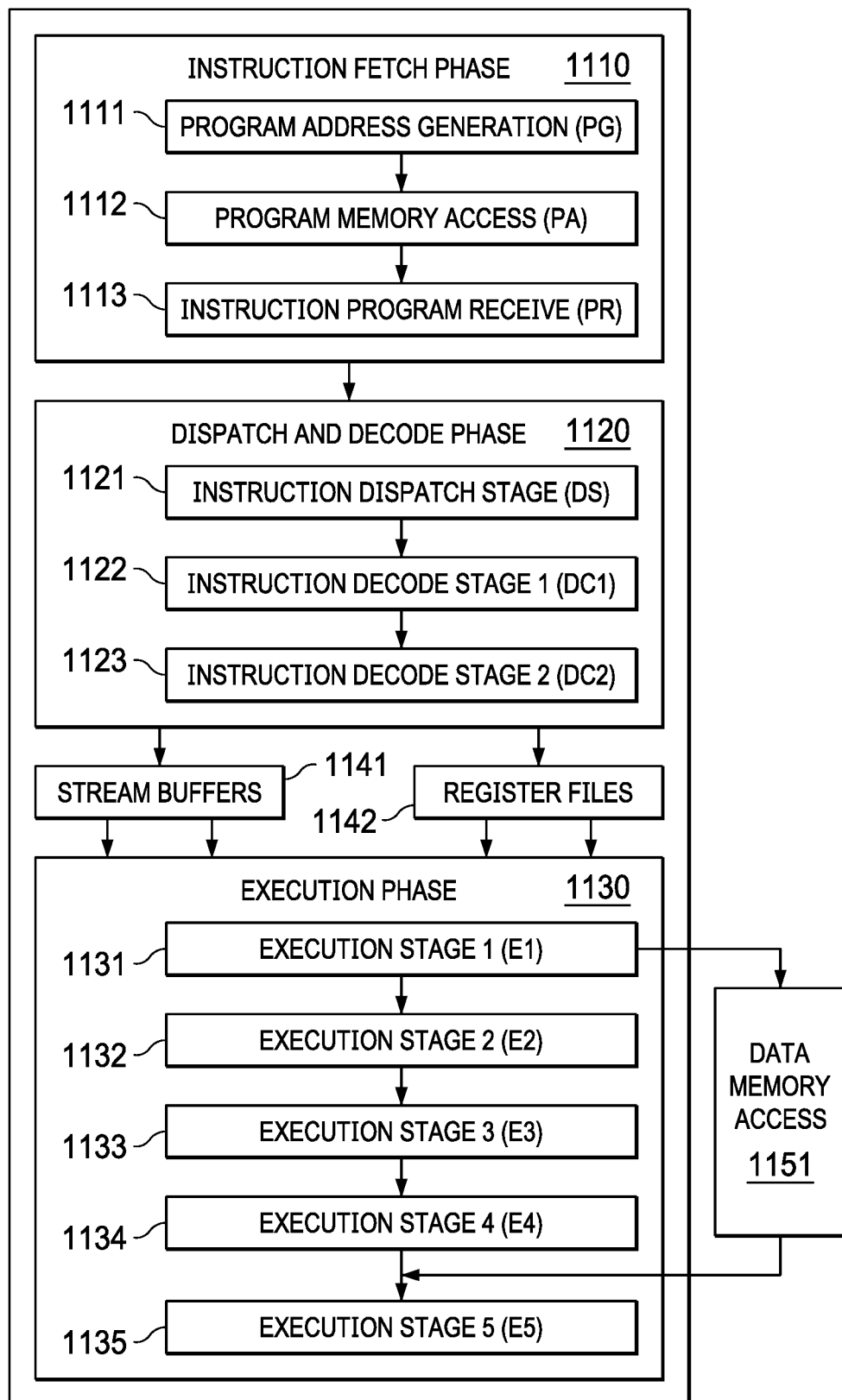
FIG. 11 shows pipeline phases of the central processing unit in accordance with various examples.

FIG. 11 illustrates the following pipeline phases: program fetch phase 1110, dispatch and decode phases 1120 and execution phases 1130. Program fetch phase 1110 includes three stages for all instructions. Dispatch and decode phases 1120 include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in the CPU and the read request is sent to the memory controller for the level one instruction cache L1I. During the program access stage 1112 (PA) the level one instruction cache L1I processes the request, accesses the data in its memory and sends a fetch packet to the CPU boundary. During the program receive stage 1113 (PR) the CPU registers the fetch packet.

Figure 12:
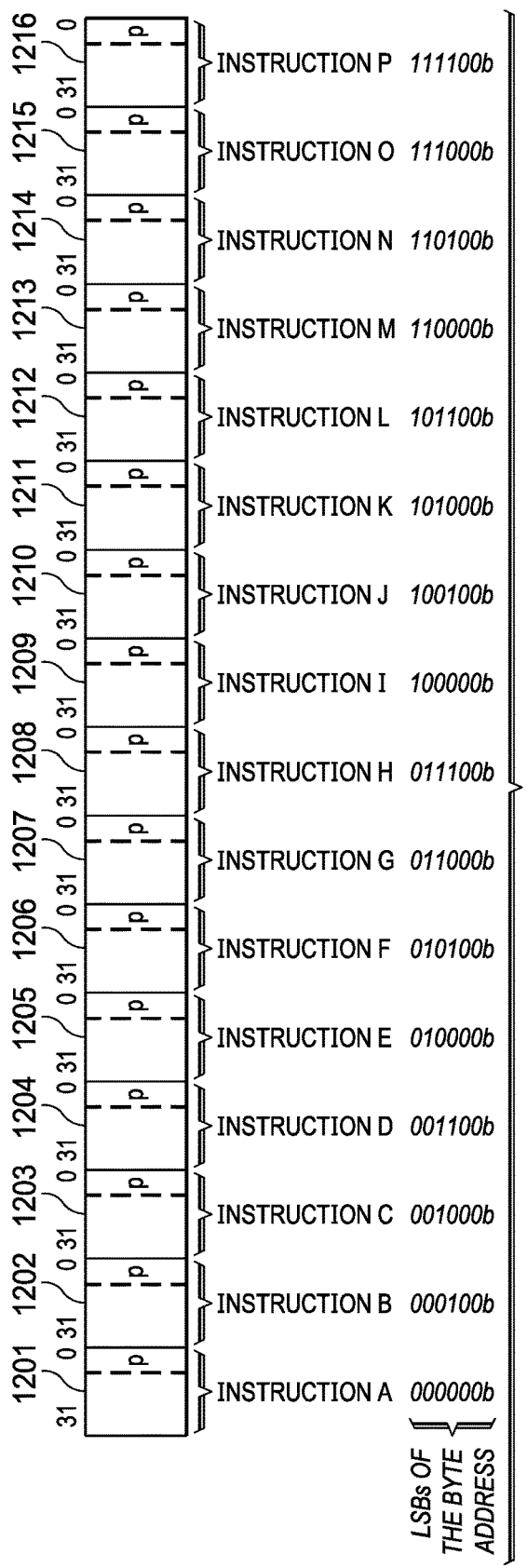
FIG. 12 shows sixteen instructions of a single fetch packet in accordance with various examples.

Instructions are always fetched sixteen 32-bit wide slots, constituting a fetch packet, at a time. FIG. 12 illustrates 16 instructions 1201 to 1216 of a single fetch packet. Fetch packets are aligned on 512-bit (16-word) boundaries. An example employs a fixed 32-bit instruction length. Fixed length instructions are advantageous for several reasons. Fixed length instructions enable easy decoder alignment. A properly aligned instruction fetch can load plural instructions into parallel instruction decoders. Such a properly aligned instruction fetch can be achieved by predetermined instruction alignment when stored in memory (fetch packets aligned on 512-bit boundaries) coupled with a fixed instruction packet fetch. An aligned instruction fetch permits operation of parallel decoders on instruction-sized fetched bits. Variable length instructions require an initial step of locating each instruction boundary before they can be decoded. A fixed length instruction set generally permits more regular layout of instruction fields. This simplifies the construction of each decoder which is an advantage for a wide issue VLIW central processor.

The execution of the individual instructions is partially controlled by a p bit in each instruction. This p bit is preferably bit 0 of the 32-bit wide slot. The p bit determines whether an instruction executes in parallel with a next instruction. Instructions are scanned from lower to higher address. If the p bit of an instruction is 1, then the next following instruction (higher memory address) is executed in parallel with (in the same cycle as) that instruction. If the p bit of an instruction is 0, then the next following instruction is executed in the cycle after the instruction.

CPU 110 and level one instruction cache L1I 121 pipelines are de-coupled from each other. Fetch packet returns from level one instruction cache L1I can take different number of clock cycles, depending on external circumstances such as whether there is a hit in level one instruction cache 121 or a hit in level two combined cache 130. Therefore program access stage 1112 (PA) can take several clock cycles instead of 1 clock cycle as in the other stages.

The instructions executing in parallel constitute an execute packet. In an example, an execute packet can contain up to sixteen instructions. No two instructions in an execute packet may use the same functional unit. A slot is one of five types: 1) a self-contained instruction executed on one of the functional units of CPU 110 (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246); 2) a unitless instruction such as a NOP (no operation) instruction or multiple NOP instruction; 3) a branch instruction; 4) a constant field extension; and 5) a conditional code extension. Some of these slot types will be further explained below.

Dispatch and decode phases 1120 include instruction dispatch to appropriate execution unit stage 1121 (DS), instruction pre-decode stage 1122 (DC1); and instruction decode, operand reads stage 1123 (DC2). During instruction dispatch to appropriate execution unit stage 1121 (DS), the fetch packets are split into execute packets and assigned to the appropriate functional units. During the instruction pre-decode stage 1122 (DC1), the source registers, destination registers and associated paths are decoded for the execution of the instructions in the functional units. During the instruction decode, operand reads stage 1123 (DC2), more detailed unit decodes are done, as well as reading operands from the register files.

Execution phases 1130 includes execution stages 1131 to 1135 (E1 to E5). Different types of instructions require different numbers of these stages to complete their execution. These stages of the pipeline play an important role in understanding the device state at CPU cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG phase is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the CPU boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

In some cases, the processor 100 (e.g., a DSP) may be called upon to execute software that requires emulating floating-point operations. Special floating-point values such as zero values, subnormal values, +/− infinity values, and not a number (NaN) values may need to be handled as special cases. However, classifying floating-point values as one of the special value types may require several instructions to extract fields from a floating-point value (e.g., a fraction field or an exponent field) and to test or compare those fields to properly classify the floating-point value. Since emulation of floating-point operations carried out by the DSP 100 may be frequent and repetitive, increased instruction and computational overhead to effectively classify a floating-point value is not desirable.

Floating-point operands are classified as single precision (e.g., 32-bit values) and double precision (e.g., 64-bit values). IEEE floating-point numbers may be classified as a zero value, a normal value, a subnormal value, an infinite value, and a NaN value. NaN values may be either a quiet NaN (QNaN) or a signaling NaN (SNaN). Subnormal values are nonzero values that are smaller than the smallest nonzero normal value. Infinity is a value that represents an infinite floating-point number. NaN values represent results for invalid operations, such as (+infinity+(−infinity)). Normal single precision values are accurate to at least six decimal places, sometimes up to nine decimal places. Normal double precision values are accurate to at least 15 decimal places, sometimes up to 17 decimal places.

Figure 13A:
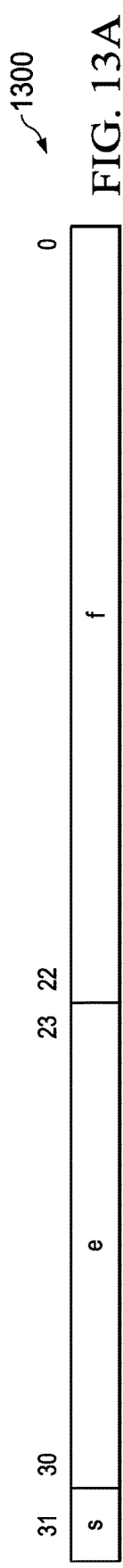
FIGS. 13A and 13B show exemplary single precision and double precision floating-point values, respectively, in accordance with various examples.

FIG. 13A shows an example coding of a single precision floating-point value 1300. The single precision floating-point value 1300 comprises 32 bits as explained above. Bit 31 is a sign bit (s) (e.g., 0 is a positive value, 1 is a negative value). Bits 23 to 30 are an 8-bit exponent field (e). Bits 0 to 22 are a 23-bit fraction field (f). The fields of the floating-point value 1300 represent floating-point values within two ranges: normal (0<e<255) and subnormal (e=0).

The following formulas define how to translate the sign, exponent, and fraction fields into a single precision floating-point value.

$$-1^s \times 2^{(e-127)} \times 1.f, \text{ where } 0<e<255; \quad \text{Normal:}$$

$$-1^s \times 2^{-126} \times 0.f, \text{ where } e=0 \text{ and } f \text{ is nonzero.} \quad \text{Subnormal:}$$

In addition to normal and subnormal values described above, the single precision floating-point value 1300 may also be classified according to the following Table 1.1:

TABLE 1.1

Special Single Precision Values

| Symbol | Sign (s) | Exponent (e) | Fraction (f) |
|---|---|---|---|
| +0 | 0 | 0 | 0 |
| −0 | 1 | 0 | 0 |
| +Inf | 0 | 255 | 0 |
| −Inf | 1 | 255 | 0 |
| NaN | x | 255 | nonzero |
| QNaN | x | 255 | 1xx . . . x |
| SNaN | x | 255 | 0xx . . . x and nonzero |

As demonstrated in Table 1.1, zero values include both +/− zero, which differs only in the sign bit of the floating-point value 1300. Similarly, infinity values include both +/− infinity, which differs only in the sign bit of the floating-point value 1300. Further, a NaN value is generalized (e.g., fraction field is nonzero) while a QNaN value (e.g., fraction field equal to 1xx . . . x) and a SNaN value (e.g., fraction field equal to 0xx . . . x, but not zero) are more specific versions of the generalized NaN classification. The sign bit is not considered for classification of a floating-point value as a NaN value.

Figure 13B:
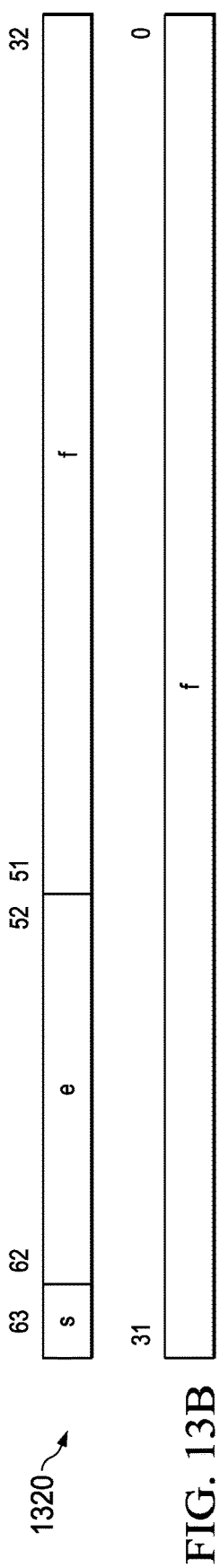

FIG. 13B shows an example coding of a double precision floating-point value 1320. The double precision floating-point value 1320 comprises 64 bits as explained above. Bit 63 is a sign bit (s) (e.g., 0 is a positive value, 1 is a negative value). Bits 52 to 62 are an 11-bit exponent field (e). Bits 0 to 51 are a 52-bit fraction field (f). Similar to the single precision floating-point value 1300, the fields of the floating-point value 1320 represent floating-point values within two ranges: normal (0<e<2047) and subnormal (e=0). The following formulas define how to translate the sign, exponent, and fraction fields into a double precision floating-point value.

$$-1^s \times 2^{(e-1023)} \times 1.f, \text{ where } 0<e<2047; \quad \text{Normal:}$$

$$-1^s \times 2^{-1022} \times 0.f, \text{ where } e=0 \text{ and } f \text{ is nonzero.} \quad \text{Subnormal:}$$

In addition to normal and subnormal values described above, the double precision floating-point value 1320 may also be classified according to the following Table 1.2:

TABLE 1.2

Special Double Precision Values

| Symbol | Sign (s) | Exponent (e) | Fraction (f) |
|---|---|---|---|
| +0 | 0 | 0 | 0 |
| −0 | 1 | 0 | 0 |
| +Inf | 0 | 2047 | 0 |
| −Inf | 1 | 2047 | 0 |
| NaN | x | 2047 | nonzero |
| QNaN | x | 2047 | 1xx . . . x |
| SNaN | x | 2047 | 0xx . . . x and nonzero |

As demonstrated in Table 1.2, zero values include both +/− zero, which differs only in the sign bit of the floating-point value 1320. Similarly, infinity values include both +/− infinity, which differs only in the sign bit of the floating-point value 1320. Further, a NaN value is generalized (e.g., fraction field is nonzero) while a QNaN value (e.g., fraction field equal to 1xx . . . x) and a SNaN value (e.g., fraction field equal to 0xx . . . x, but not zero) are more specific versions of the generalized NaN classification. The sign bit is not considered for classification of a floating-point value as a NaN value.

Figure 14A:
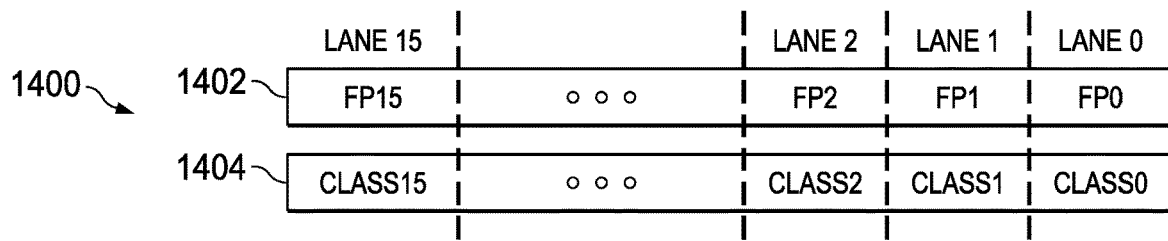
FIGS. 14A and 14B show exemplary sets of registers, including a source register and a destination register, involved with the execution of instructions in accordance with various examples.

FIG. 14A illustrates an example of registers 1400 utilized in executing a vector floating-point classification instruction for single precision floating-point values (e.g., each floating-point value is 32 bits). The registers 1400 include a source register 1402 and a destination register 1404. In this example, the source register 1402 and the destination register 1404 are 512-bit vector registers such as those contained in the global vector register file 231 explained above. However, as will be explained further below, in some examples the destination register 1404 may be smaller in size than the source register 1402. In other examples, the source register 1402 may also be of a different sizes; the scope of this disclosure is not limited to a particular register size or set of register sizes.

In this example where the floating-point values to be classified are single precision (e.g., 32 bits or a single word), the source register 1402 and the destination register 1404 are divided into 16 equal-sized labeled Lane 0 through Lane 15. Each lane of the source register 1402 contains a single precision floating-point value, labeled FP0 through FP15. Each lane of the destination register 1404 contains a value indicative of a type of floating-point value that results from classifying the floating-point values contained in the source register 1402. The values indicative of a floating-point type in the destination register 1404 are labeled CLASS0 through CLASS15 for simplicity. Data that is in a like-numbered lane in different registers is said to be in a "corresponding" lane. For example, FP0 of the source register 1402 and CLASS0 of the destination register 1404 are in a corresponding lane, namely Lane 0.

Figure 14B:
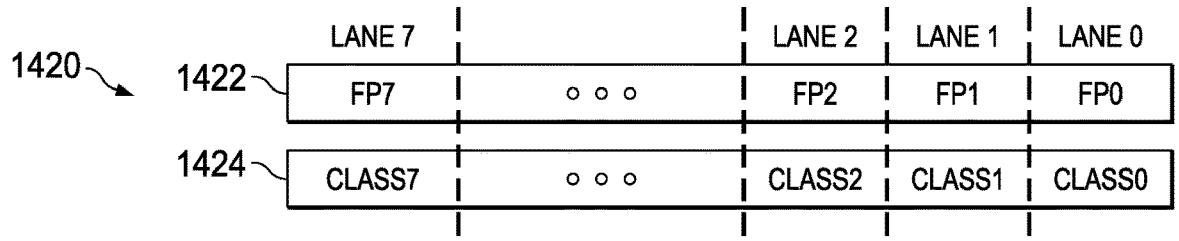

FIG. 14B illustrates an example of registers 1420 utilized in executing a vector floating-point classification instruction for double precision floating-point values (e.g., each floating-point value is 64 bits). The registers 1420 include a source register 1422 and a destination register 1424. In this example, the source register 1422 and the destination register 1424 are 512-bit vector registers such as those contained in the global vector register file 231 explained above. However, as will be explained further below, in some examples the destination register 1424 may be smaller in size than the source register 1422. In other examples, the source register 1422 may also be of a different sizes; the scope of this disclosure is not limited to a particular register size or set of register sizes.

In this example where the floating-point values to be classified are double precision (e.g., 64 bits or a double word), the source register 1422 and the destination register 1424 are divided into 8 equal-sized labeled Lane 0 through Lane 7. Each lane of the source register 1422 contains a double precision floating-point value, labeled FP0 through FP7. Each lane of the destination register 1424 contains a value indicative of a type of floating-point value that results from classifying the floating-point values contained in the source register 1422. The values indicative of a floating-point type in the destination register 1424 are labeled CLASS0 through CLASS7 for simplicity. Data that is in a like-numbered lane in different registers is said to be in a "corresponding" lane. For example, FP0 of the source register 1422 and CLASS0 of the destination register 1424 are in a corresponding lane, namely Lane 0.

A vector floating-point classification instruction contains fields that specify the source register 1402, 1422 and the destination register 1404, 1424 (e.g., in the global vector register file 231). The vector floating-point classification instruction also contains a field (e.g., an opcode field, which will be explained further below) that specifies whether floating-point values are single precision or double precision (e.g., lane size of the source register 1402, 1422).

In response to executing the vector floating-point classification instruction, the DSP 100 classifies each floating-point value in the various lanes (either single precision or double precision) of the source register 1402, 1422. As a result of the classification of floating-point values in the lanes of the source register 1402, 1422, the DSP 100 identifies type of the floating-point value and stores a value indicative of the identified type in a corresponding lane of the destination register 1404, 1424.

As explained above, floating-point values may be classified as a zero value, a subnormal value, a normal value, an infinity value, or a NaN value (being either a QNaN or SNaN). The type of a single precision floating-point value is determined according to the Table 1-1 and the formulas for normal and subnormal values, explained above with respect to FIG. 13A. Similarly, the type of a double precision floating-point value is determined according to the Table 1-2 and the formulas for normal and subnormal values, explained above with respect to FIG. 13B. The particular value that is stored in the corresponding lane of the destination register 1404, 1424 to indicate the identified type of floating-point value in the source register 1402, 1422 may take different forms, provided that the types of floating-point values are able to be differentiated. The scope of this disclosure is not limited to any particular value or set of values that is or are stored in the corresponding lane of the destination register 1404, 1424 to indicate the identified type of floating-point value in the source register 1402, 1422.

Additionally, since the indications of the identified type of floating-point value are stored in corresponding lanes of the destination register 1404, 1424, vectorized forms of functions may utilize the classifications in the destination register 1404, 1424 to correctly handle special values in individual vector lanes. For example, vector predicates may be applied as appropriate to certain vector lanes in which the floating-point value has been classified as a zero value, a subnormal value, a normal value, an infinity value, or a NaN value (being either a QNaN or SNaN).

For example, in response to the identified type of a floating-point value in a lane of the source register 1402, 1422 being a zero value, the DSP 100 is configured to store a value of 0 in the corresponding lane of the destination register 1404, 1424.

In response to the identified type of a floating-point value in a lane of the source register 1402, 1422 being a subnormal value, the DSP 100 is configured to store a value of 1 in the corresponding lane of the destination register 1404, 1424.

In response to the identified type of a floating-point value in a lane of the source register 1402, 1422 being a normal value, the DSP 100 is configured to store a value of 2 in the corresponding lane of the destination register 1404, 1424.

In response to the identified type of a floating-point value in a lane of the source register 1402, 1422 being an infinity value, the DSP 100 is configured to store a value of 3 in the corresponding lane of the destination register 1404, 1424.

In response to the identified type of a floating-point value in a lane of the source register 1402, 1422 being a NaN value, the DSP 100 is configured to store a value of 4 in the corresponding lane of the destination register 1404, 1424.

In response to the identified type of a floating-point value in a lane of the source register 1402, 1422 being a SNaN value, the DSP 100 is configured to store a value of 8 in the corresponding lane of the destination register 1404, 1424. In another example, since SNaNs are also NaNs, the DSP 100 is configured to store a value of 12 (e.g., 4 for being classified as a NaN plus 8 for being more specifically classified as a SNaN) in the corresponding lane of the destination register 1404, 1424.

In this example, the range of values that can possibly be written to a corresponding lane of the destination register 1404, 1424 can be represented by 4 bits (e.g., values of 0, 1, 2, 3, 4, and 8). Thus, while the destination register 1404, 1424 has been described as also being a 512-bit vector register, in certain examples the destination register 1404, 1424 may be a smaller-sized register. For a single precision vector floating-point classification instruction, in which 16 floating-point values are stored in the source register 1402, the destination register 1404 may be a 64-bit register 1404, with 4-bit lanes corresponding to each of the 16 32-bit lanes of the source register 1402. Similarly, for a double precision vector floating-point classification instruction, in which 8 floating-point values are stored in the source register 1422, the destination register 1424 may be a 32-bit register 1424, with 4-bit lanes corresponding to each of the 8 64-bit lanes of the source register 1422. As noted above, the scope of this disclosure should not be limited to any particular size of source register 1402, 1422 or destination register 1404, 1424.

Figures 15A, 15B:
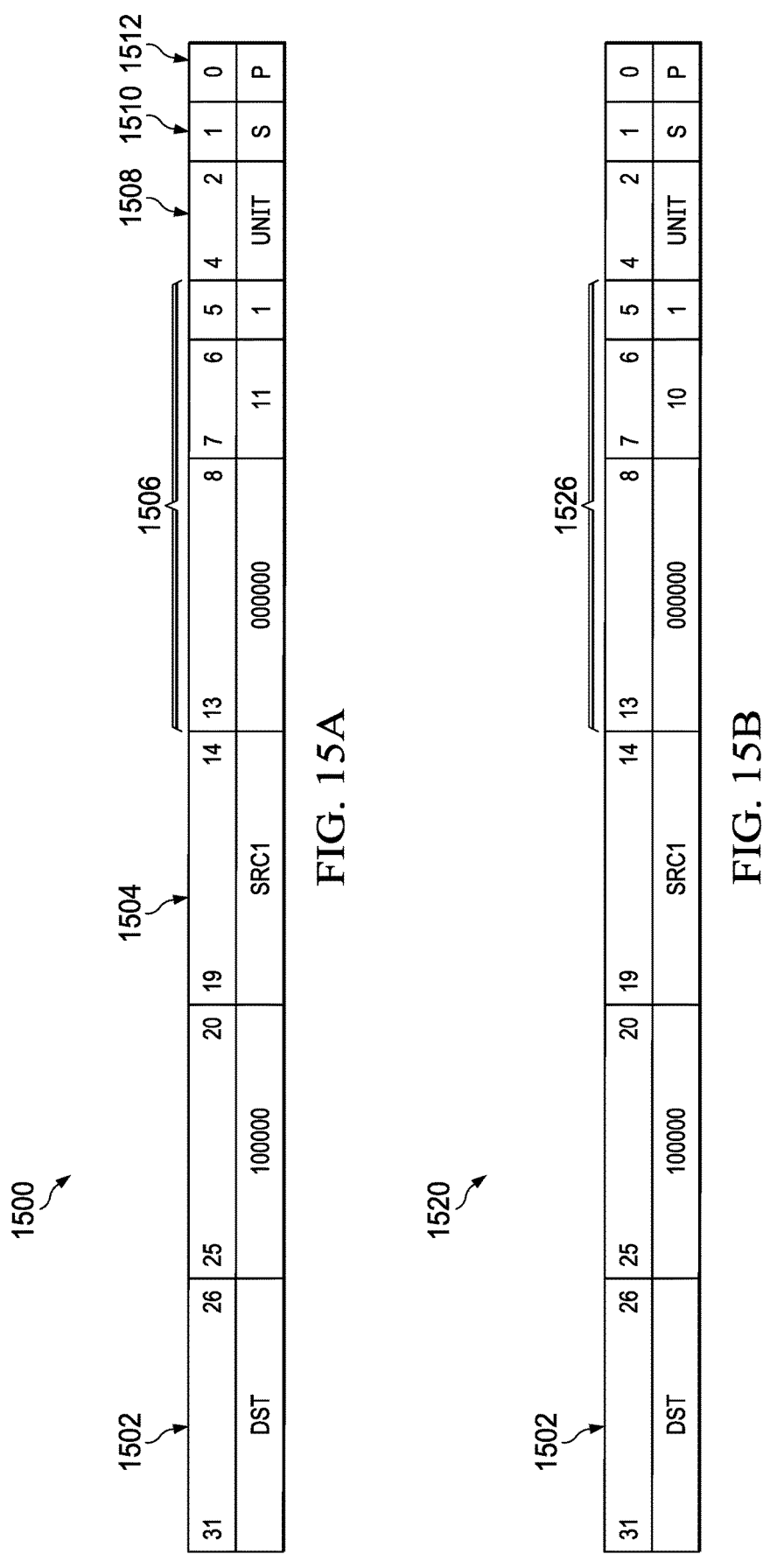

FIG. 15A illustrates an example of the instruction coding 1500 of functional unit instructions used by examples of this disclosure. Those skilled in the art would realize that other instruction codings are feasible and within the scope of this disclosure. Each instruction consists of 32 bits and controls the operation of one of the individually controllable functional units (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246). The bit fields are defined as follows.

The dst field 1502 (bits 26 to 31) specifies a destination register in a corresponding vector register file 231 that contains the results of execution of the vector floating-point classification instruction (e.g., a 512-bit vector in one example).

In the exemplary instruction coding 1500, bits 20 to 25 contains a constant value that serves as a placeholder.

The src1 field 1504 (bits 14 to 19) specifies the source data, which includes floating-point values that are, in the example of FIG. 15A, single precision floating-point values that are to be classified according to the above description prior to a result of the classification being stored in the destination register.

The opcode field 1506 (bits 5 to 13) designates appropriate instruction options (e.g., whether lanes of the source data single precision floating-point values (32 bits) or double precision floating-point values (64 bits)). For example, the opcode field 1506 of FIG. 15A corresponds to single precision floating-point classification, for example as shown in FIG. 14A. FIG. 15B illustrates instruction coding 1520 that is identical to that shown in FIG. 15A, except that the instruction coding 1520 includes an opcode field 1526 that corresponds to double precision floating-point classification, for example. The unit field 1508 (bits 2 to 4) provides an unambiguous designation of the functional unit used and operation performed, which in this case is the L1 unit 221 or the S1 unit 222. A detailed explanation of the opcode is generally beyond the scope of this disclosure except for the instruction options detailed above.

The s bit 1510 (bit 1) designates scalar datapath side A 115 or vector datapath side B 116. If s=0, then scalar datapath side A 115 is selected. This limits the functional unit to L1 unit 221, S1 unit 222, M1 unit 223, N1 unit 224, D1 unit 225 and D2 unit 226 and the corresponding register files illustrated in FIG. 2. Similarly, s=1 selects vector datapath side B 116 limiting the functional unit to L2 unit 241, S2 unit 242, M2 unit 243, N2 unit 244, P unit 246 and the corresponding register file illustrated in FIG. 2.

The p bit 1512 (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to twelve instructions. Each instruction in an execute packet must use a different functional unit.

Figure 16:
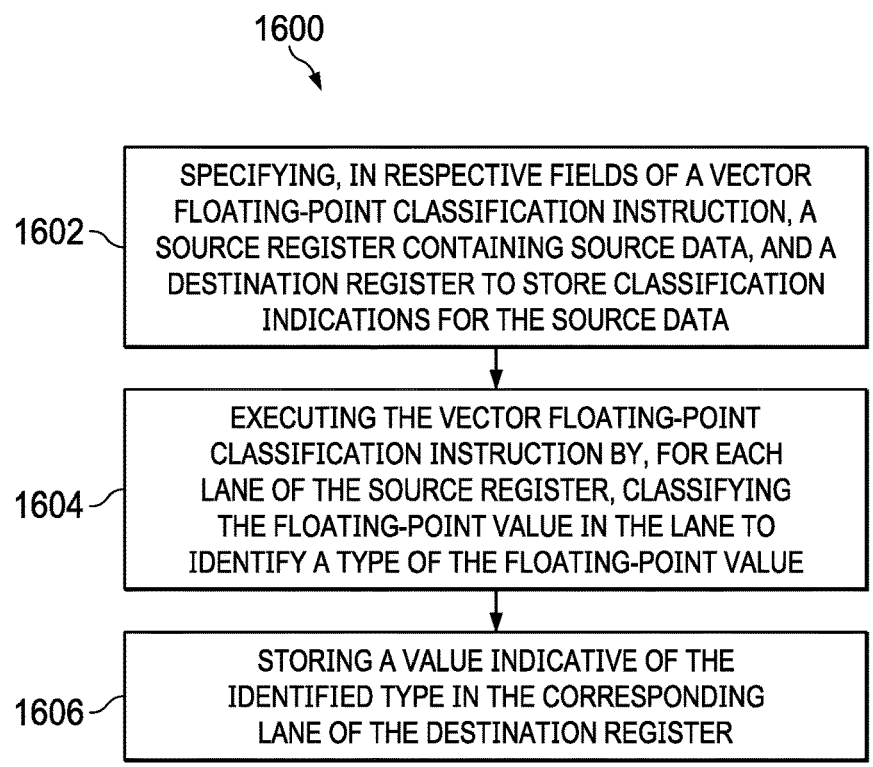
FIG. 16 shows a flow chart of a method of executing instructions in accordance with various examples.

FIG. 16 shows a flow chart of a method 1600 in accordance with examples of this disclosure. The method 1600 begins in block 1602 with specifying a source register containing source data, and a destination register configured to store classification indications for the source data. The source register and the destination register are specified in fields of a vector floating-point classification instruction, such as the src1 field 1504 and the dst field 1502, respectively, which are described above with respect to FIGS. 15A and 15B. The source data may be a 512-bit vector in which floating-point values are either single precision floating-point values or double-precision floating point values. Further, the classification indications may take various numerical values to identify the type of the corresponding floating-point value. In some examples, the destination register is also a 512-bit vector register.

The method 1600 continues in block 1604 with executing the vector floating-point classification instruction, in particular by, for each lane of the source register, classifying the floating-point value in the lane to identify a type of the floating-point value. As explained above, floating-point values may be classified as a zero value, a normal value, a subnormal value, an infinite value, and a NaN value. NaN values may be either a quiet NaN (QNaN) or a signaling NaN (SNaN).

The method 1600 continues in block 1606 with storing a value indicative of the identified type in a corresponding lane of the destination register. As one example of values indicative of identified types, a value of 0 is stored in response to the floating-point value being a zero value, a value of 1 is stored in response to the floating-point value being a subnormal value, a value of 2 is stored in response to the floating-point value being a normal value, a value of 3 is stored in response to the floating-point value being an infinity value, a value of 4 is stored in response to the floating-point value being a NaN value, and a value of 8 is stored in response to the floating-point value being a SNaN value.

In the foregoing discussion and in the claims, the terms "including" and "comprising" are used in an open-ended fashion, and thus should be interpreted to mean "including, but not limited to . . . ." Also, the term "couple" or "couples"

is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A processor comprising:
    a set of functional units; and
    a set of registers coupled to the set of functional units, wherein:
        each register of the set of functional units includes a set of lanes; and
        the processor is configured to:
            receive an instruction that specifies a source register of the set of registers and a destination register of the set of registers; and
            based on the instruction, cause a functional unit of the set of functional units to, for each lane of the set of lanes of the source register:
                determine whether a respective value stored in the respective lane of the source register matches a type within a set of types; and
                store an indicator of whether the respective value matches in a respective lane of the set of lanes of the destination register.

2. The processor of claim 1, wherein the set of types includes at least one of: a zero value, a subnormal value, a normal value, an infinite value, a not-a-number value, a quiet not-a-number value, and a signaling not-a-number value.

3. The processor of claim 1, wherein:
    the set of functional units includes a plurality of functional units each configured to, for each lane of the set of lanes of the source register:
        determine whether the respective value stored in the respective lane of the source register matches a type within the set of types; and
        store the indicator of whether the respective value matches in the respective lane of the set of lanes of the destination register; and
    the instruction includes a field that specifies the functional unit from among the plurality of functional units.

4. The processor of claim 1, wherein:
    the set of functional units are arranged in a scalar datapath and a vector datapath; and
    the instruction includes a field that specifies whether to execute the instruction using the scalar datapath or the vector datapath.

5. The processor of claim 1, wherein, for each lane of the set of lanes of the source register, the respective value is a floating point value.

6. The processor of claim 1, wherein the instruction includes a field that specifies whether the respective value stored in each lane of the set of lanes of the source register is a single precision floating point value or a double precision floating point value.

7. The processor of claim 1, wherein, for each lane of the set of lanes of the source register, the respective value is a single precision floating point value.

8. The processor of claim 1, wherein, for each lane of the set of lanes of the source register, the respective value is a double precision floating point value.

9. The processor of claim 1, wherein the instruction includes a field that specifies whether the instruction is permitted to be performed in parallel with another instruction.

10. The processor of claim 1, wherein the source register has a width of 512 bits.

11. A method comprising:
    receiving an instruction that specifies a source register and a destination register, wherein each of the source register and the destination register have a set of lanes; and
    based on the instruction, for each lane of the set of lanes of the source register:
        determining whether a respective value stored in the respective lane matches a type within a set of types; and
        storing an indicator of whether the respective value matches in a respective lane of the set of lanes of the destination register.

12. The method of claim 11, wherein the set of types includes at least one of: a zero value, a subnormal value, a normal value, an infinite value, a not-a-number value, a quiet not-a-number value, and a signaling not-a-number value.

13. The method of claim 11, wherein the instruction includes a field that specifies a functional unit from among a set of functional units of a processor to perform the determining of whether the respective value matches a type and the storing of the indicator.

14. The method of claim 11, wherein the instruction includes a field that specifies a datapath from among a scalar datapath and a vector datapath of a processor to perform the determining of whether the respective value matches a type and the storing of the indicator.

15. The method of claim 11, wherein, for each lane of the set of lanes of the source register, the respective value is a floating point value.

16. The method of claim 11, wherein the instruction includes a field that specifies whether the respective value stored in each lane of the set of lanes of the source register is a single precision floating point value or a double precision floating point value.

17. The method of claim 11, wherein, for each lane of the set of lanes of the source register, the respective value is a single precision floating point value.

18. The method of claim 11, wherein, for each lane of the set of lanes of the source register, the respective value is a double precision floating point value.

19. The method of claim 11, wherein the instruction includes a field that specifies whether the instruction is permitted to be performed in parallel with another instruction.

20. The method of claim 11, wherein the source register has a width of 512 bits.

\* \* \* \* \*